United States Patent
Bodo et al.

(10) Patent No.: US 7,577,842 B2
(45) Date of Patent: Aug. 18, 2009

(54) METHODS OF SCRAMBLING AND UNSCRAMBLING A VIDEO SIGNAL, A SYSTEM, AN ENCODER, A DECODER, A BROADCAST SERVER, AND A DATA MEDIUM FOR IMPLEMENTING THE METHODS

(75) Inventors: Yann Bodo, Rennes (FR); Nathalie Laurent, Vignoc (FR); Christophe Laurent, Vignoc (FR)

(73) Assignee: France Telecom, Paris (FR)

( * ) Notice: Subject to any disclaimer, the term of this patent is extended or adjusted under 35 U.S.C. 154(b) by 648 days.

(21) Appl. No.: 10/437,177

(22) Filed: May 14, 2003

(65) Prior Publication Data
US 2004/0037422 A1 Feb. 26, 2004

(30) Foreign Application Priority Data
May 24, 2002 (FR) ................................. 02 06405

(51) Int. Cl.
*H04N 7/167* (2006.01)
*H04L 9/32* (2006.01)

(52) U.S. Cl. ...................... 713/176; 380/203
(58) Field of Classification Search ............... 380/210, 380/203; 348/699; 725/31; 713/176
See application file for complete search history.

(56) References Cited

U.S. PATENT DOCUMENTS

| 5,091,938 | A | * | 2/1992 | Thompson et al. | 380/239 |
|---|---|---|---|---|---|
| 5,166,976 | A | * | 11/1992 | Thompson et al. | 380/225 |
| 5,185,794 | A | * | 2/1993 | Thompson et al. | 380/235 |
| 5,377,266 | A | * | 12/1994 | Katta et al. | 380/217 |
| 5,459,516 | A | * | 10/1995 | Song | 348/402.1 |
| 5,534,927 | A | * | 7/1996 | Shishikui et al. | 348/400.1 |
| 5,546,461 | A | * | 8/1996 | Ibaraki et al. | 380/217 |
| 5,636,279 | A | * | 6/1997 | Katta et al. | 380/217 |
| 5,809,139 | A |   | 9/1998 | Girod et al. |   |
| 5,960,081 | A | * | 9/1999 | Vynne et al. | 713/176 |
| 6,069,956 | A | * | 5/2000 | Kurihara | 380/212 |
| 6,175,639 | B1 | * | 1/2001 | Satoh et al. | 382/100 |

(Continued)

FOREIGN PATENT DOCUMENTS

WO  WO 02/25861 A1  3/2002

OTHER PUBLICATIONS

Junehwa Song et al. "A Fast Algorithm for DCT-Domain Inverse Motion Compensation Based on Shared Information in a Macroblock." Aug. 5, 2000. IEEE Transactions on Circuits and Systems for Video Technology. vol. 10, No. 5. p. 767-775.*

(Continued)

*Primary Examiner*—Christian LaForgia
(74) *Attorney, Agent, or Firm*—Oliff & Berridge, PLC

(57) ABSTRACT

The invention relates in particular to a method of scrambling a video signal using an encryption key for controlling access to audiovisual information. The video signal is scrambled by applying a tattooing function to the video signal by using a marking key derived from the encryption key, the tattooing function including a parameter for regulating the amplitude of tattooing so as to enable the visibility of the tattooing in the video signal to be adjusted. The invention also provides a dual unscrambling method, and a system, an encoder, a decoder, a broadcast server, and a data medium for implementing said methods.

23 Claims, 4 Drawing Sheets

U.S. PATENT DOCUMENTS

| | | | |
|---|---|---|---|
| 6,249,548 B1* | 6/2001 | Kleihorst et al. | 375/240.17 |
| 6,286,103 B1* | 9/2001 | Maillard et al. | 726/26 |
| 6,341,350 B1* | 1/2002 | Miyahara et al. | 713/176 |
| 6,505,299 B1* | 1/2003 | Zeng et al. | 713/160 |
| 6,621,933 B2* | 9/2003 | Chung et al. | 382/233 |
| 6,668,068 B2* | 12/2003 | Hashimoto | 382/100 |
| 6,671,376 B1* | 12/2003 | Koto et al. | 380/210 |
| 6,674,874 B1* | 1/2004 | Yoshida et al. | 382/100 |
| 6,839,468 B1* | 1/2005 | Mitchell et al. | 382/250 |
| 6,891,958 B2* | 5/2005 | Kirovski et al. | 382/100 |
| 6,915,000 B1* | 7/2005 | Tanaka | 382/100 |
| 6,944,296 B1* | 9/2005 | Liu et al. | 380/201 |
| 6,957,350 B1* | 10/2005 | Demos | 380/203 |
| 7,072,470 B2* | 7/2006 | Koto et al. | 380/210 |
| 2001/0021260 A1* | 9/2001 | Chung et al. | 382/100 |
| 2002/0138734 A1* | 9/2002 | David et al. | 713/176 |
| 2002/0146131 A1* | 10/2002 | Onagawa | 380/277 |
| 2003/0120926 A1* | 6/2003 | Fukushima et al. | 713/176 |
| 2004/0024588 A1* | 2/2004 | Watson et al. | 704/200.1 |

OTHER PUBLICATIONS

Wenjun Zeng et al. "Efficient Frequency Domain Selective Scrambling of Digital Video." Mar. 1, 2003. IEEE Transactions on Multimedia. vol. 5, No. 1. p. 118-129.*

Jordan et al., "Proposal of a watermarking technique for hiding/retrieving data in compressed and decompressed video", ISO/IEC JTCI/SC29/WG11, MPEG97, Jul. 1997.

Zhang et al., "Video Watermarking Technique in Motion Vector", IEEE 2001, pp. 179-182.

* cited by examiner

Prior Art

METHODS OF SCRAMBLING AND UNSCRAMBLING A VIDEO SIGNAL, A SYSTEM, AN ENCODER, A DECODER, A BROADCAST SERVER, AND A DATA MEDIUM FOR IMPLEMENTING THE METHODS

The present invention relates to a method of scrambling a video signal using an encryption key for controlling access to audiovisual information transmitted by a broadcast server.

The invention also provides a method of unscrambling a video signal, and a system, an encoder, a decoder, a broadcast server, and a data medium for implementing said methods.

BACKGROUND

There exist numerous scrambling methods implemented for controlling access to audiovisual information. For example, one solution is provided by the DVB Scrambling method of the digital video broadcasting (DVB) consortium.

Those methods generally make use of an encryption key for scrambling the video signal. The scrambling is generally based on performing an exclusive-OR (XOR) operation between the non-scrambled stream and the encryption key.

For example, in the context of broadcasting programs, a user desiring to access audiovisual information receives the scrambled signal together with a message of the Entitlement Control Message (ECM) type which represents an MPEG-2 Transport Stream (MPEG-2 TS) packet conveying, amongst other things, a decryption key associated with the encryption key. It is the decryption key which is used for unscrambling the video.

Unfortunately, the result of that type of scrambling method is to supply the user with a video signal that is scrambled but that cannot be viewed. The scrambled video signal does not make it possible for the user to get some idea of the audiovisual content prior to unscrambling.

SUMMARY

The present invention seeks to remedy that drawback by providing a method of unscrambling a video signal that enables the video content to be scrambled while nevertheless ensuring that it remains viewable to some extent.

To this end, the invention provides a scrambling method of the above-specified type, wherein the video signal is scrambled by applying a watermarking function to the video signal using a marking key derived from the encryption key, the watermarking function including a parameter for regulating the amplitude of the watermarking that enables the visibility thereof in the video signal to be adjusted.

A scrambling method of the invention may further comprise one or more of the following characteristics:

the audiovisual information is accessible from a broadcast server;

the audiovisual information is stored on a data medium that is accessible for reading;

the watermarking function is applied to motion vectors obtained by encoding the video signal;

the watermarking function is applied to a frequency representation of said motion vectors;

the scrambling comprises the following steps:

selecting motion vectors from a set of motion vectors obtained by encoding the video signal;

separating abscissa and ordinate components of the selected vectors in two vectors respectively referred to as the abscissa vector and the ordinate vector;

applying a one-dimensional Discrete Cosine Transform (DCT) type transform to each of said two vectors;

applying the watermarking function using the marking key to the components of the DCT transforms of the abscissa and ordinate vectors; and performing an inverse DCT transform on the abscissa and ordinate vectors and recombining them so as to provide new values for the selected motion vectors, after watermarking;

the motion vectors are extracted directly from the encoded video stream, the video signal being scrambled after being encoded;

the motion vectors are selected while encoding the video signal, the video signal then being scrambled while it is being encoded;

the scrambling is combined with invisible watermarking of the video signal by applying a watermarking function using a watermarking key including information concerning author rights;

the author rights information includes an identifier of the video and an identifier of the author having rights over the video;

said watermarking key is combined with the marking key using a function presenting one-to-one correspondence to generate a new marking key used instead of the marking key for scrambling the video signal;

the video signal is encoded in conformity with the MPEG-2 or the MPEG-4 standard;

spectrum spreading is performed on the marking key; and each image is scrambled by a marking key obtained by permutation of the marking key of the preceding image.

The invention also provides a method of unscrambling a video signal using a decryption key, wherein the unscrambling is performed on a signal scrambled by a scrambling method as described above.

The unscrambling method may further comprise one or more of the following characteristics:

it comprises the following steps:

selecting motion vectors from a set of motion vectors obtained by encoding the video signal;

separating the abscissa and ordinate components of the selected vectors in two vectors referred to respectively to as the abscissa vector and the ordinate vector;

applying a one-dimensional DCT type transform to each of said two vectors;

applying a watermarking function using a marking key derived from the decryption key to the components of the DCT transforms of the abscissa and ordinate vectors; and applying an inverse DCT transform to the abscissa and ordinate vectors and recombining them to produce the new values of the selected motion vectors; and each image is unscrambled by a marking key obtained by permutation of the marking key of the preceding image.

The invention also provides an encoder including means for analyzing motion, the encoder further comprising means for scrambling a video signal by implementing a scrambling method as described above.

The invention also provides a decoder, including means for unscrambling a video signal by implementing an unscrambling method as described above.

The invention also provides a video signal broadcast server including means for scrambling the video signal by implementing a scrambling method as described above.

The invention also provides an access terminal for connection to an information transmission network to receive a video signal broadcast on the network, the terminal including means for unscrambling the video signal by implementing an unscrambling method as described above.

The invention also provides a computer-readable data medium, including means for storing a video signal scrambled using a scrambling method as described above.

Finally, the invention also provides a system for scrambling and unscrambling a video signal using an encryption key for controlling access to audiovisual information, the system comprising a broadcast server for broadcasting the video signal associated with storage means for storing the video signal, and connected to an information transmission network for broadcasting the video signal, the system including means for scrambling the video signal by implementing a scrambling method as described above.

A scrambling and unscrambling system of the invention may also include the characteristic whereby it includes an access terminal connected to the information transmission network, said access terminal including means for unscrambling the video signal by implementing an unscrambling method as described above.

BRIEF DESCRIPTION OF THE DRAWINGS

The invention will be better understood from the following description, given purely by way of example and made with reference to the accompanying drawings, in which.

DETAILED DESCRIPTION OF EMBODIMENTS

Figure 1:
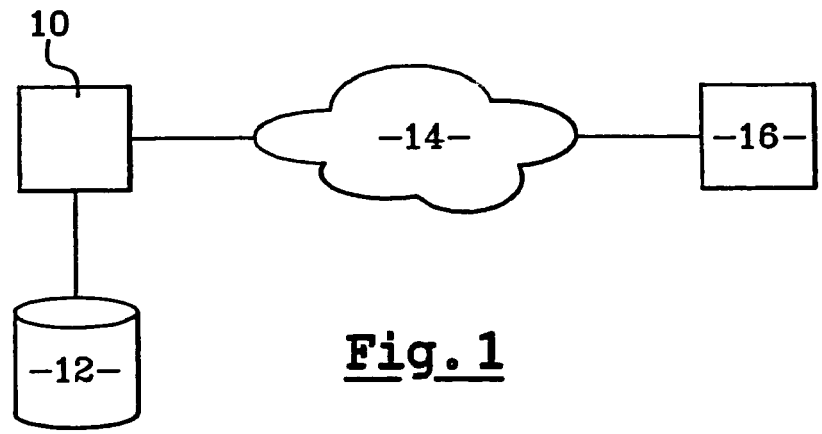
FIG. 1 is a diagram showing the structure of a system for broadcasting a video signal using a method of the invention.

The system shown in FIG. 1 comprises a server 10 for broadcasting audiovisual information stored in a database 12 connected thereto.

The broadcast server 10 is of conventional type and comprises, for example, a central processor unit (CPU) associated with random access memory (RAM) and read-only memory (ROM) for implementing a method of scrambling audiovisual information that is to be broadcast.

The broadcast server 10 is also connected to an information transmission network 14, such as the Internet. Scrambled audiovisual information can thus be transmitted via this network to at least one identified client terminal 16.

Means for secure data exchange using a conventional protocol are installed on the broadcast server 10 and also on the client terminal 16.

Figure 4:
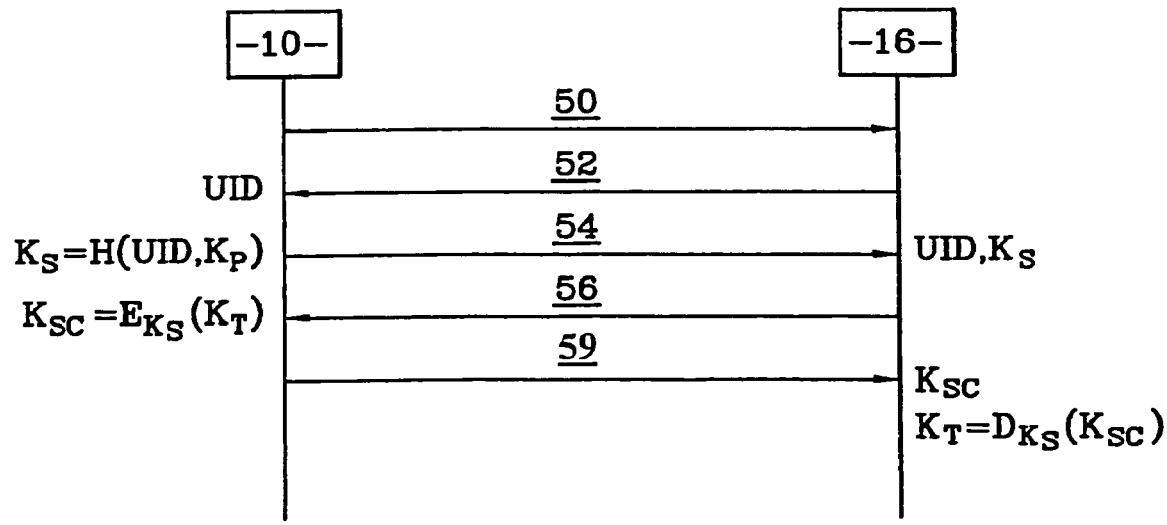
FIG. 4 shows a method of exchanging keys for unscrambling a video signal scrambled using a method of the invention.

The installation of such secure data exchange means is necessary for implementing a method of exchanging confidential data, as described below with reference to FIG. 4.

Figure 2:
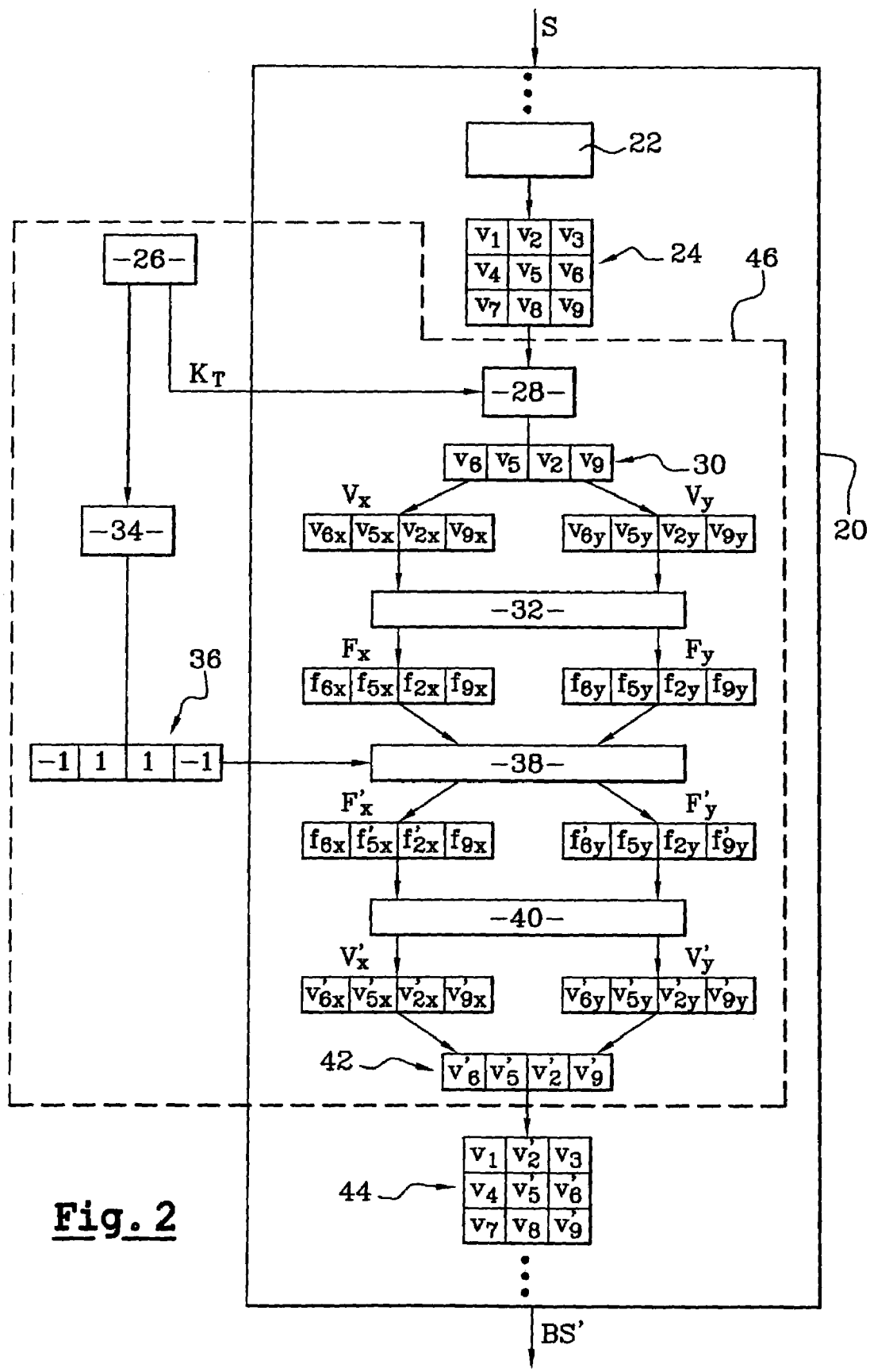
FIG. 2 shows the various steps of a first implementation of the scrambling method of the invention.

The scrambling method shown in FIG. 2 is implemented by the broadcast server 10 using its software and hardware means. Its function is to process a video signal in order to scramble it.

In this implementation, the broadcast server 10 includes an encoder 20, e.g. an MPEG-2 encoder, adapted to receive as input a source video signal S and to deliver as output an encoded binary signal ready to be modulated prior to being broadcast over the network 14.

In this case, the client terminal 16 is provided with an MPEG-2 type decoder in order to be able to decode and display the source signal S.

The broadcast server 10 can also use an MPEG-4 standard encoder, in which case the client terminal decoder 16 must likewise comply with the MPEG-4 standard. It is also possible to use any other encoder that scans motion in a multidimensional sequence including a time component.

In conventional manner, the encoder 20 has a module 22 for estimating motion which associates a matrix of motion vectors 24 with a given image of the video signal S.

This matrix of motion vectors serves to generate a predicted image of the image in question on the basis, for example, of the preceding image of the video signal, by moving macroblocks of pixels thereof as a function of the motion vectors.

As a result, it is possible to transmit only the matrix 24 of motion vectors and the content of a residual image that is the result of taking the difference between the image under consideration and its predicted image, in order to enable the decoder to restore the image under consideration. Starting from the preceding image, it is possible to reconstruct the predicted image on decoding using the matrix 24 of motion vectors, and it is then possible to restore the image under consideration by adding the transmitted residual image to the predicted image. This conventional method enables the video signal S to be compressed efficiently.

The matrix 24 of motion vectors shown in this figure comprises nine motion vectors $V_1$ to $V_9$. Naturally, the number of motion vectors is generally greater. Only nine are shown in order to clarify the description below.

During a step 26, the broadcast server 10 generates an encryption key $K_T$ associated with the video signal S. This key is stored in the database 12 together with the corresponding audiovisual data.

Thereafter, during a step 28, the broadcast server 10 selects in pseudo-random manner from said encryption key a set 30 of motion vectors from the motion vectors of the matrix 24. In this example, the selected set of motion vectors is constituted by the vectors $V_6$, $V_5$, $V_2$, and $V_9$.

Thereafter, the server 10 separates the abscissa and ordinate components of the selected vectors into two vectors referred respectively as the abscissa vector $V_x$ and the ordinate vector $V_y$. Thus, the vector $V_x$ comprises four components representing the abscissas of the four vectors in the set 30, i.e.:

$$V_x = (V_{6x}, V_{5x}, V_{2x}, V_{9x})$$

Similarly, $V_y$ comprises four components taken from the ordinates of the four vectors of the set 30, i.e.:

$$V_y = (V_{6y}, V_{5y}, V_{2y}, V_{9y})$$

During following step 32, the broadcast server 10 applies a transform of the one-dimensional DCT type to each of these two vectors.

This produces two vectors $F_x$ and $F_y$ representing the vectors $V_x$ and $V_y$ respectively, but in the frequency domain.

These two new vectors have the following components:

$$F_x = (F_{6x}, F_{5x}, F_{2x}, F_{9x}) \text{ and } F_y = (F_{6y}, F_{5y}, F_{2y}, F_{9y})$$

During a step 34 following the step 26 of generating the encryption key, the broadcast server 10 generates a marking key 36 representing a binary version of the encryption key $K_T$, in which zero values are replaced by the value −1.

In order to make the scrambling even more robust, it is advantageous also to spread the spectrum of the marking key 36. To do this, the marking key is oversampled and then random noise is added thereto. Redundancy is thus created in the marking key which is, in addition, scrambled by the noise.

The marking key has as many binary components as there are motion vectors selected during step 28, i.e. the marking key 36 has as many components as each of the vectors $F_x$ and $F_y$. In this example, a marking key 36 is shown that has four binary components, with the first and last components having the value −1 and the second and third components having the value 1.

The marking key 36 obtained during step 34 is inserted into the selected motion vectors during a step 38 by applying the following watermarking function:

if $W_i=-1$, then $F'X_i=FX_i+W_i\alpha$ and $F'Y_i=FY_i$, else $F'X_i=FX_i$ and $F'Y_i=FY_i+W_i\alpha$, where $W_i$, $FX_i$, $FY_i$, $F'X_i$, and $F'Y_i$ represent, respectively, the i-th components of the marking key 36, of the vectors $F_x$ and $F_y$, and of new values $F'_x$ and $F'_y$ for the vectors $F_x$ and $F_y$ after watermarking.

$\alpha$ is a coefficient that is selected a priori, representing the strength of the marking. The greater the value of $\alpha$, the greater the modification to the frequency components of the selected motion vectors, and the greater the extent to which the scrambling is visible in the video signal.

As a result of this operation, on leaving step 38, the following two vectors are obtained:

$F'_x=(F_{6x},F'_{5x},F'_{2x},F_{9x})$ and $F'y=(F'_{6y},F_{5y},F_{2y},F'_{9y})$ The method then moves onto a step 40 during which the broadcast server 10 applies an inverse DCT transform to the vectors $F'_x$ and $F'_y$ so as to output two vectors $V'_x$ and $V'_y$ in which all of the components differ from the components of the vectors $V_x$ and $V_y$. Thus, it can be seen that the insertion of the marking key 36 into the selected motion vectors is spread over all of the components thereof.

Thereafter, the server 10 combines the new components of the vectors $V'_x$ and $V'_y$ so as to reconstitute a set 42 of four motion vectors corresponding to scrambled values for the initially selected vectors $V_6$, $V_5$, $V_2$, and $V_9$.

These new motion vectors are written $V'_6$, $V'_5$, $V'_2$, and $V'_9$.

These new vectors $V'_6$, $V'_5$, $V'_2$, and $V'_9$ replace the vectors $V_6$, $V_5$, $V_2$, and $V_9$ in order to provide a new matrix 44 of motion vectors. This new matrix 44 makes it possible on decoding to obtain a scrambled version of the initial image under consideration.

The set of steps enabling the matrix 44 to be generated from the matrix 24 of motion vectors, i.e. the set constituted by the steps 26, 28, 32, 34, 38, and 40 is referred to below as the scrambler module and is given an overall reference 46.

In the encoder 20, in conventional manner, motion estimation is reiterated on each image of the video signal S so as to obtain, at the output from the encoder 20, a scrambled binary signal BS' in which all of the matrices of motion vectors are scrambled, and which can be stored in the database 12 prior to being broadcast over the network 14.

On each iteration, it is possible to implement a conventional permutation on the marking key prior to inserting it in the following video image so as to make the key even more difficult to detect.

Optionally, the above-described method includes a step (not shown) of invisible watermarking of the video signal S.

This watermarking is performed in conventional manner by applying a watermarking function to the signal, for example a function similar to that described above, but with a value for a that is low enough for the watermarking to be invisible, and using a second marking key. This second marking key, referred to as the "watermarking key" is constituted, for example, by an identifier of the author having rights in the video.

The watermarking step can be performed independently of the scrambling, and either before or after the scrambler module 46.

The watermarking step may also be combined with scrambling. It is possible to correlate the watermarking key and the marking key 36 using a function providing one-to-one correspondence such as an XOR function so as to generate a new marking key referred to as the "watermarked marking key". This watermarked marking key is then used by the scrambler module 46 instead of the marking key 36.

The one-to-one relationship of the correlation function makes it possible to ensure that the signal can be unscrambled without necessarily removing its watermarking.

Figure 3:
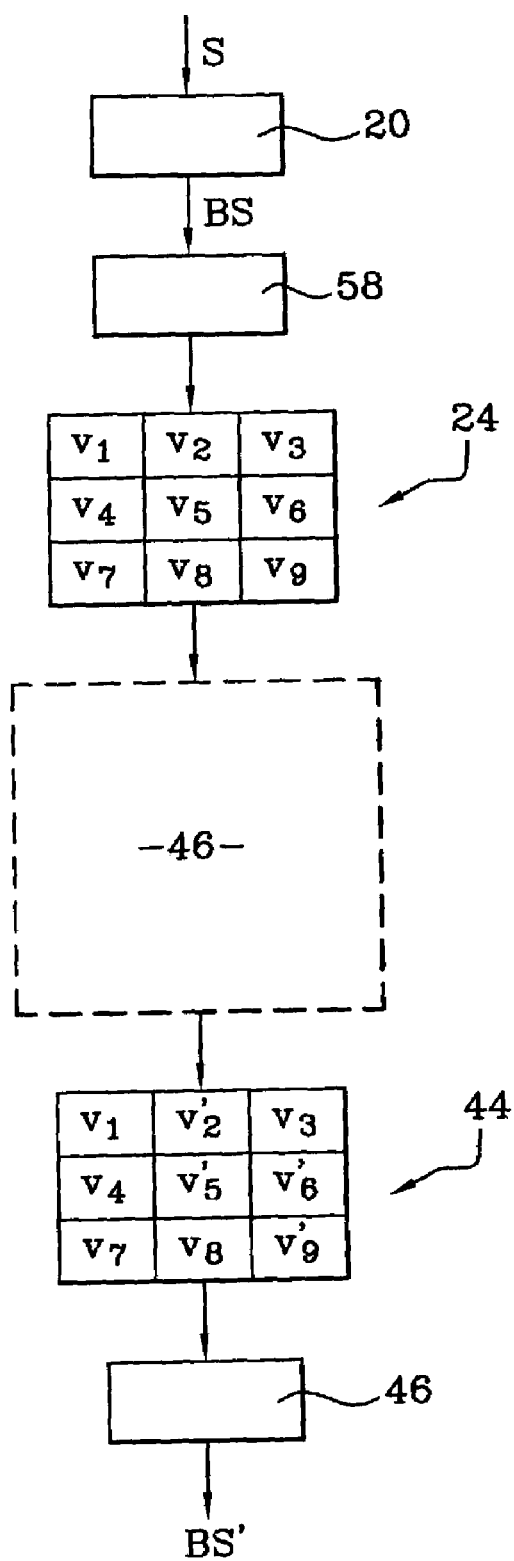
FIG. 3 shows the various steps of a second implementation of a scrambling method of the invention.

FIG. 3 shows a second implementation of the scrambling method shown in FIG. 2.

Whereas in the preceding example, the scrambler module 46 is shown as being an integral portion of the encoder 20 and as operating after a step 22 of estimating motion, the implementation of FIG. 3 shows a scrambler module 46 that is independent of the encoder 20.

In this implementation, the video signal S is initially processed by the encoder 20 to provide a binary signal BS at its output.

The binary signal BS is then input to a syntax analyzer 58 capable of automatically extracting the matrix 24 of motion vectors. As before, this matrix 24 is input to the scrambler module 46 so as to obtain, at the output thereof, a new matrix 44 that is scrambled.

Finally, during a last step, the new matrix 44 is reintroduced into the binary signal BS, replacing the old matrix 24 so as to provide the scrambled binary signal BS'. This operation is performed on all of the matrices of motion vectors in the binary signal BS.

In this implementation, the above-described watermarking step can likewise be performed either independently of the scrambler module 46, or in combination with scrambling.

Since the client terminal 16 is provided with a decoder that is compatible with the MPEG-2 standard, it is capable of decoding the binary signal BS' broadcast by the broadcast server 10.

In addition, if the client terminal 16 possesses the encryption key $K_T$, it is also capable of reconstituting proper values for the scrambled motion vectors by implementing a method that is the dual of the scrambler module 46 as described above. This dual method, referred to as an unscrambler method, is described in detail below with reference to FIG. 5.

To enable the client terminal 16 to perform unscrambling, a method of transmitting the encryption key $K_T$ is described with reference to FIG. 4.

During a first step 50, the client terminal 16 downloads a scrambled binary video signal BS' from the broadcast server 10.

During the following step 52, the user terminal 16 requests the broadcast server 10 to download an unscrambling application to view the content of the video of interest.

On receiving this request, the broadcast server 10 generates an identifier UID and a secret key $K_S$ obtained by applying a hashing function to the identifier UID and a master key $K_P$.

During the following step 54, the broadcast server send the unscrambling application requested by the client terminal 16. In secure manner, this application includes the identifier UID and the secret key $K_S$. The key $K_S$ is stored by the user terminal in a manner that is secure. Therefore the user cannot access it.

Thereafter, during a step 56, a method of purchasing the rights to view the video is implemented between the client terminal 16 and the broadcast server 10. Once purchase has been performed, the broadcast server 10 extracts from the database 12 the encryption key $K_T$ that enables the video content to be unscrambled and it enciphers it using an encryption function $E_{KS}$ which depends on the secret key $K_S$.

This produces an enciphered encryption key $K_{SC}$.

Finally, during a final step 59, the broadcast server 10 transmits the enciphered encryption key to the client terminal 16.

The client terminal can restore the encryption key $K_T$ from the enciphered encryption key and the secret key $K_S$ stored in the downloaded application, using a decryption function $D_{KS}$ that is the dual of the encryption function $E_{KS}$.

Figure 5:
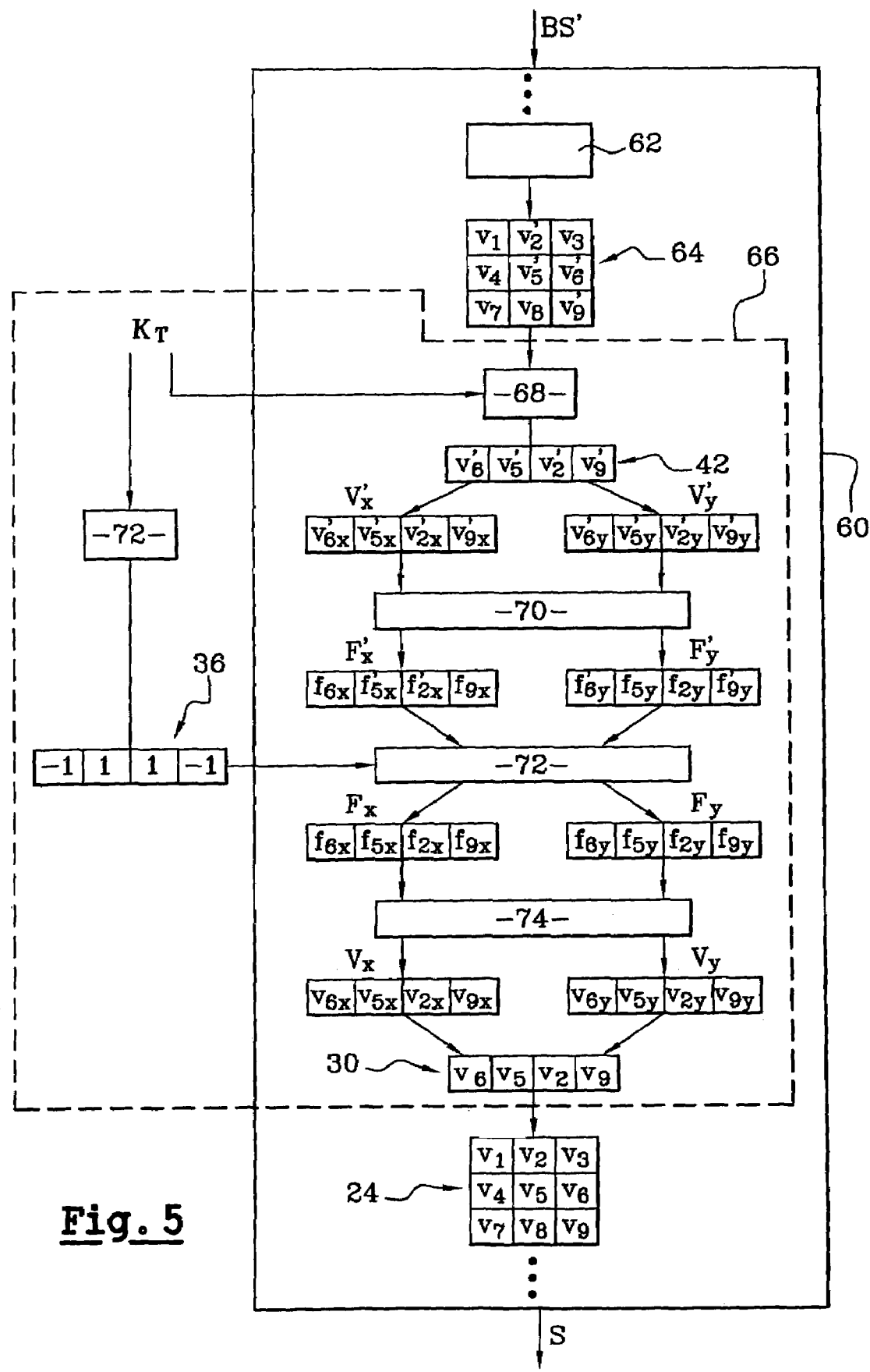
FIG. 5 shows the various steps of an unscrambling method of the invention.

The client terminal 16 includes a decoder 60 shown in FIG. 5.

The decoder 60 receives as input the scrambled binary video signal BS' and it outputs the unscrambled and decoded signal S ready for display on a display screen of the client terminal 16.

The decoder 60 includes in particular a module 62 for extracting motion vectors. This extraction module 62 outputs a matrix 64 of motion vectors identical to the matrix 44.

At least part of this matrix 64 comprises motion vectors that are scrambled, which it delivers to the input of an unscrambler module 66 of the decoder 60. The unscrambler module 66 has conventional software means for implementing a method comprising a first step 68 for pseudo-random selection of motion vectors. During this step, the selection is implemented using the encryption key $K_T$ in the same manner as the in step 28, i.e. using the same pseudo-random selection algorithm. As a result, the vectors that are selected during this step are the same vectors as those that were selected during the step 28. This constitutes the set 42 of vectors $V'_6, V'_5, V'_2$, and $V'_9$.

Thereafter, the abscissa and ordinate components of these four vectors are separated into two vectors referred to respectively as the abscissa vector $V'_x$ and the ordinate vector $V'_y$.

During the following step 70, a one-dimensional DCT type transform is applied to each of these two vectors $V'_x$ and $V'_y$.

This produces the two above-described vectors $F'_x$ and $F'Y$, representing each of the vectors $V'_x$ and $V'_y$ in the frequency domain.

During a step 72 identical to the step 34, the client terminal 16 generates the marking key 36 from the encryption key $K_T$. In the same manner as above, spectrum spreading may also be performed on the marking key 36.

During the step 72 following the step 70, the marking key 36 which was inserted in the components of the motion vectors selected during scrambling of the video signal S, is now removed from said vectors by applying the following function, which is a dual of the above-described watermarking function:

if $W_i=-1$, then $F'X_i=FX_i-W_i\alpha$ and $F'Y_i=FY_i$, else $F'X_i=FX_i$ and $F'Y_i=FY_i-W_i\alpha$, As a result of this operation, on leaving step 72, the following two vectors are obtained:

$F_x=(F_{6x},F_{5x},F_{2x},F_{9x},)$ and $F_y=(F_{6y},F_{5y},F_{2y},F_{9y})$

The method then moves onto a step 74 during which an inverse DCT transform is applied to the vectors $F_x$ and $F_y$ to obtain the two vectors $V_x$ and $V_y$ respectively comprising the abscissa components and the ordinate components of the unscrambled selected motion vectors.

Thereafter, the components of the vectors $V_x$ and $V_y$ are combined so as to reconstitute the set 30 comprising the motion vectors $V_6, V_5, V_2$, and $V_9$.

As a result, at the output from the unscrambler module 66, there is provided the matrix 24 of unscrambled motion vectors.

As for scrambling the signal S during encoding, unscrambling can be performed independently of decoding, by a method that is the dual of the method described with reference to FIG. 3.

It can clearly be seen that a method of the invention for scrambling a video signal makes it possible to improve the broadcasting of paid-for audiovisual content by enabling the transmitted video signal to be scrambled but without preventing it being viewed by a user who is potentially interested.

Another advantage of the above-described invention is that it enables invisible watermarking of the video content to be combined with scrambling thereof.

What is claimed is:

1. A method of scrambling a video signal using an encryption key for controlling access to audiovisual information, wherein the video signal is scrambled by applying a watermarking function to the video signal using a marking key derived from the encryption key, the watermarking function including a parameter for regulating the amplitude of the watermarking that enables the visibility thereof in the video signal to be adjusted, said method including a step of selecting, on the basis of said encryption key, a subset of motion vectors from a set of motion vectors obtained by encoding the video signal, wherein the watermarking function is applied to the selected motion vectors.

2. A scrambling method according to claim 1, wherein the audiovisual information is accessible from a broadcast server.

3. A scrambling method according to claim 1, wherein the audiovisual information is stored on a data medium that is accessible for reading.

4. A scrambling method according to claim 1, wherein the watermarking function is applied to a frequency representation of said motion vectors.

5. A scrambling method according to claim 4, wherein the scrambling comprises the following steps:

separating abscissa and ordinate components of the selected vectors in two vectors respectively referred to as the abscissa vector and the ordinate vector;

applying a one-dimensional DCT type transform to each of said two vectors;

applying the watermarking function using the marking key to the components of the DCT transforms of the abscissa and ordinate vectors; and performing an inverse DCT transform on the abscissa and ordinate vectors and recombining them so as to provide new values for the selected motion vectors, after watermarking.

6. A scrambling method according to claim 1, wherein the motion vectors are extracted directly from the encoded video stream, the video signal being scrambled after being encoded.

7. A scrambling method according to claim 1, wherein the motion vectors are selected while encoding the video signal, the video signal then being scrambled while it is being encoded.

8. A scrambling method according to claim 1, wherein the scrambling is combined with invisible watermarking of the video signal by applying a watermarking function using a watermarking key including information concerning author rights.

9. A scrambling method according to claim 8, wherein the author rights information includes an identifier of the video and an identifier of the author having rights over the video.

10. A scrambling method according to claim 8, wherein said watermarking key is combined with the marking key using a function presenting one-to-one correspondence to generate a new marking key used instead of the marking key for scrambling the video signal.

11. A scrambling method according to claim 1, wherein the video signal is encoded in conformity with the MPEG-2 or the MPEG-4 standard.

12. A scrambling method according to claim 1, wherein spectrum spreading is performed on the marking key.

13. A scrambling method according to claim 1, wherein each image is scrambled by a marking key obtained by permutation of the marking key of the preceding image.

14. A method of unscrambling a video signal using a decryption key, wherein the unscrambling is performed on a signal scrambled by a method of scrambling a video signal, the method of scrambling the video signal using an encryption key for controlling access to audiovisual information, wherein the video signal is scrambled by applying a watermarking function to the video signal using a marking key derived from the encryption key, the watermarking function including a parameter for regulating the amplitude of the watermarking that enables the visibility thereof in the video signal to be adjusted, said method including a step of selecting, on the basis of said encryption key, a subset of motion vectors from a set of motion vectors obtained by encoding the video signal, wherein the video signal is unscrambled by applying a dual function of the said watermarking function to the video signal to remove the said marking key, and the watermarking function is applied to the selected motion vectors.

15. An unscrambling method according to claim 14, wherein the unscrambling comprises the following steps:
   separating the abscissa and ordinate components of the selected vectors in two vectors referred to respectively to as the abscissa vector and the ordinate vector;
   applying a one-dimensional DCT type transform to each of said two vectors;
   applying a watermarking function using a marking key derived from the decryption key to the components of the DCT transforms of the abscissa and ordinate vectors; and
   applying an inverse DCT transform to the abscissa and ordinate vectors and recombining them to produce the new values of the selected motion vectors.

16. An unscrambling method according to claim 14, wherein each image is unscrambled by a marking key obtained by permutation of the marking key of the preceding image.

17. An encoder device including means for analyzing motion, the encoder device comprising a scrambler for scrambling a video signal by implementing a method of scrambling a video signal, the method of scrambling the video signal using an encryption key for controlling access to audiovisual information, said method including a step of selecting, on the basis of said encryption key, a subset of motion vectors from a set of motion vectors obtained by encoding the video signal, wherein the video signal is scrambled by applying a watermarking function to the video signal using a marking key derived from the encryption key, the watermarking function including a parameter for regulating the amplitude of the watermarking that enables the visibility thereof in the video signal to be adjusted, and the watermarking function is applied to the selected motion vectors.

18. A decoder device, including an unscrambler for unscrambling a video signal by implementing an unscrambling method according to claim 14.

19. A server device for broadcasting a video signal, the server device including a scrambler for scrambling the video signal by implementing a method of scrambling a video signal, the method of scrambling the video signal using an encryption key for controlling access to audiovisual information, said method including a step of selecting, on the basis of said encryption key, a subset of motion vectors from a set of motion vectors obtained by encoding the video signal, wherein the video signal is scrambled by applying a watermarking function to the video signal using a marking key derived from the encryption key, the watermarking function including a parameter for regulating the amplitude of the watermarking that enables the visibility thereof in the video signal to be adjusted, and the watermarking function is applied to the selected motion vectors.

20. An access terminal device for connection to an information transmission network to receive a video signal broadcast over said network, the terminal device including an unscrambler for unscrambling the video signal by implementing a method according to claim 14.

21. A computer-readable data medium, including a storage device for storing a video signal that has been scrambled using a method of scrambling a video signal, the method of scrambling the video signal using an encryption key for controlling access to audiovisual information, said method including a step of selecting, on the basis of said encryption key, a subset of motion vectors from a set of motion vectors obtained by encoding the video signal, wherein the video signal is scrambled by applying a watermarking function to the video signal using a marking key derived from the encryption key, the watermarking function including a parameter for regulating the amplitude of the watermarking that enables the visibility thereof in the video signal to be adjusted, and the watermarking function is applied to the selected motion vectors.

22. A system for scrambling and unscrambling a video signal using an encryption key for controlling access to audiovisual information, the system comprising a broadcast server for broadcasting the video signal associated with storage device for storing the video signal, and connected to an information transmission network for broadcasting the video signal, the system including a scrambler for scrambling the video signal by implementing a method of scrambling a video signal, the method of scrambling the video signal using an encryption key for controlling access to audiovisual information, said method including a step of selecting, on the basis of said encryption key, a subset of motion vectors from a set of motion vectors obtained by encoding the video signal, wherein the video signal is scrambled by applying a watermarking function to the video signal using a marking key derived from the encryption key, the watermarking function including a parameter for regulating the amplitude of the watermarking that enables the visibility thereof in the video signal to be adjusted, and the watermarking function is applied to the selected motion vectors.

23. A scrambling and unscrambling system, for scrambling and unscrambling a video signal using an encryption key for controlling access to audiovisual information, the system comprising a broadcast server for broadcasting the video signal associated with storage device for storing the video signal, and connected to an information transmission network for broadcasting the video signal, and including an access terminal connected to the information transmission network, said access terminal including unscrambler for unscrambling the video signal by implementing a method according to claim 14.

* * * * *